Figure 1:
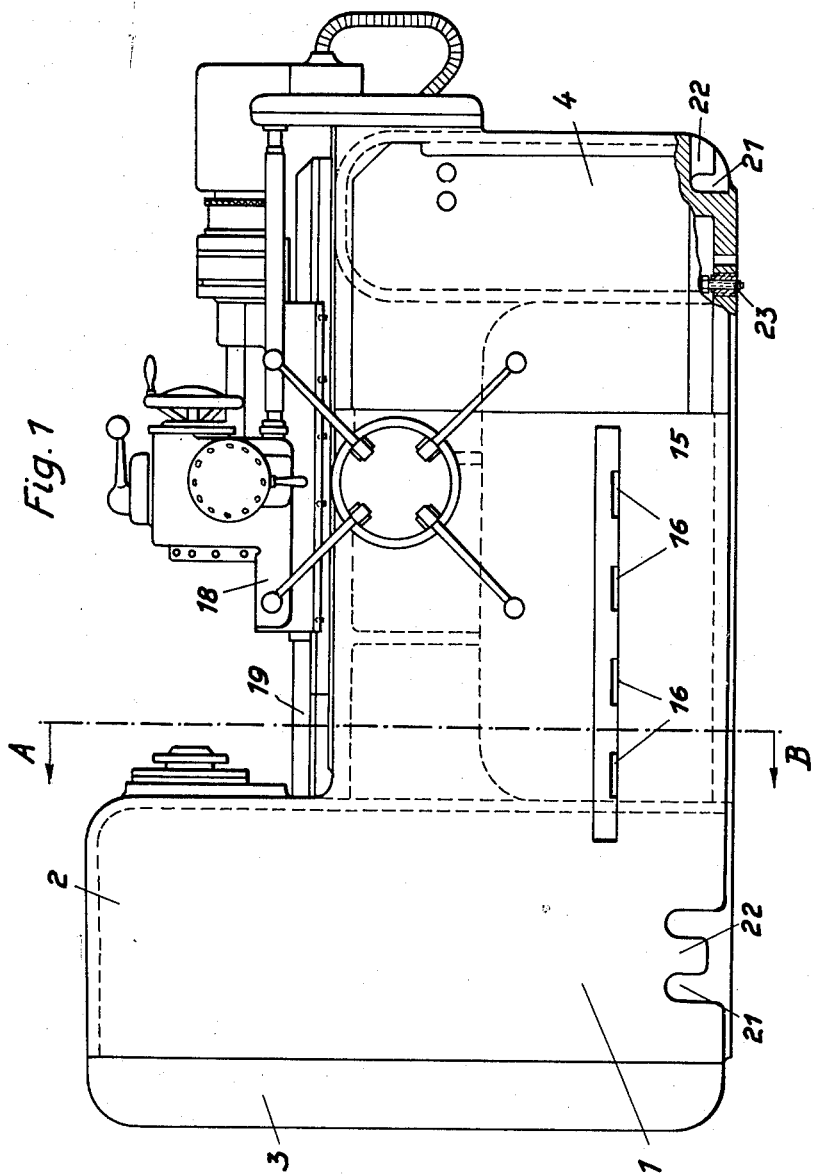

Feb. 14, 1956 W. MÖBIUS 2,734,415
FRAME FOR LATHES AND TURRET LATHES
Filed May 1, 1951 5 Sheets-Sheet 1

Inventor:
WALTER MÖBIUS by

Attorney

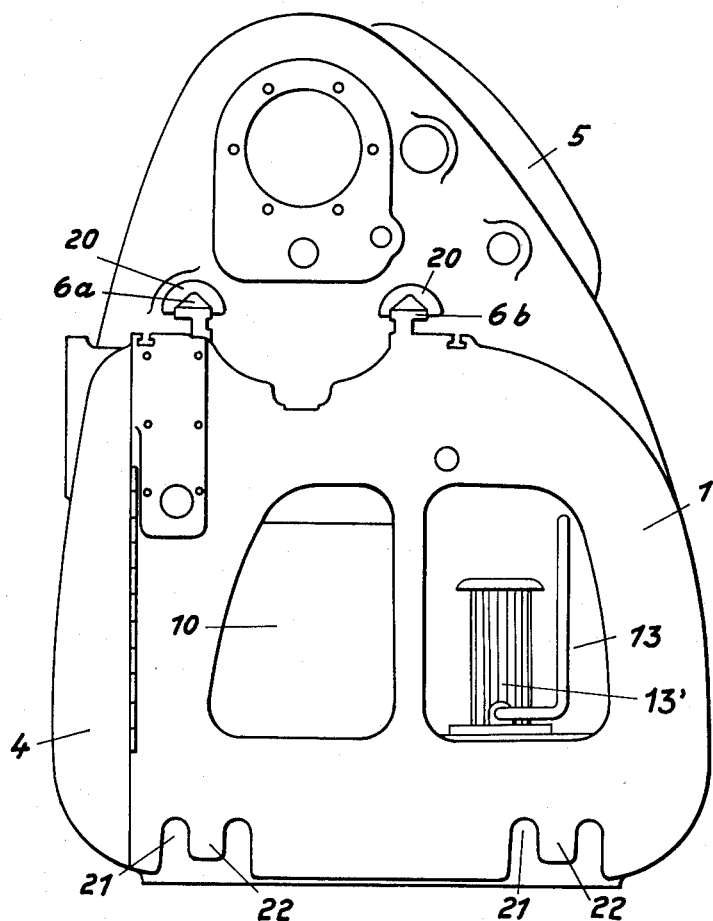

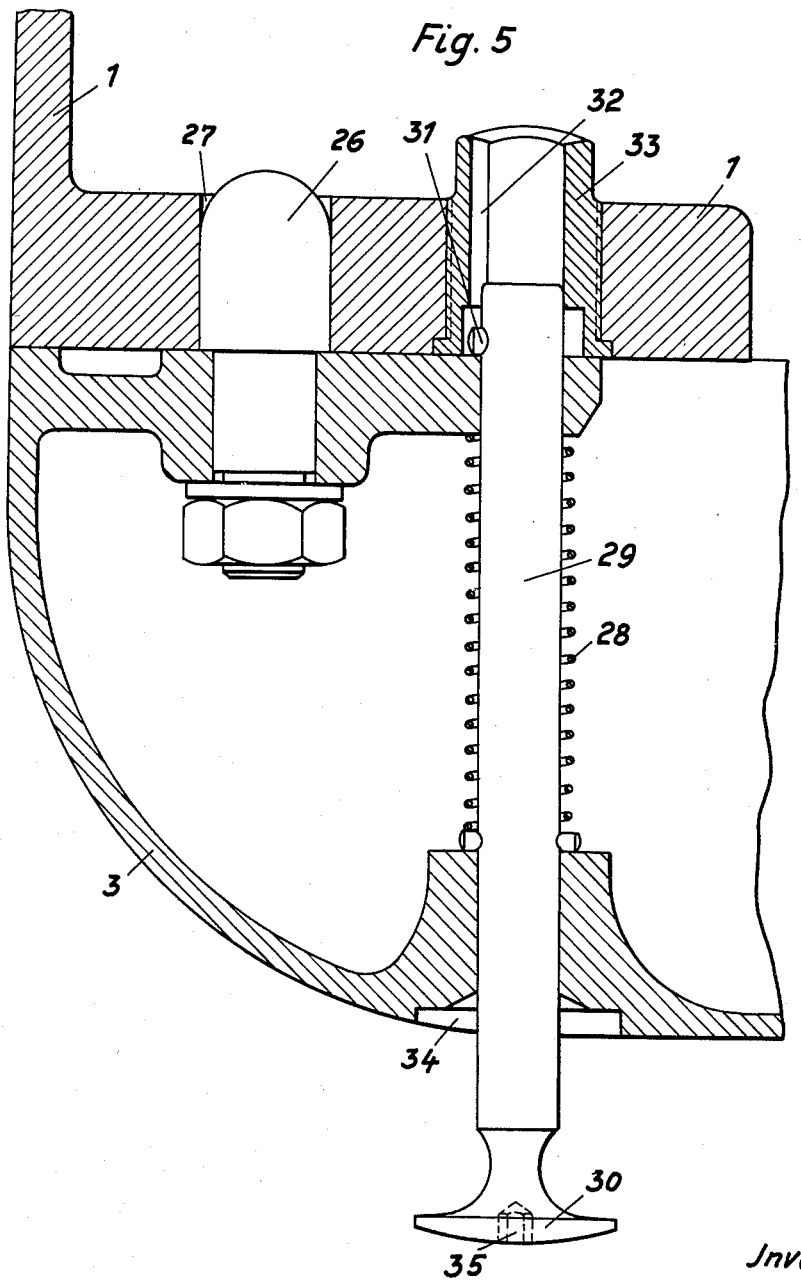

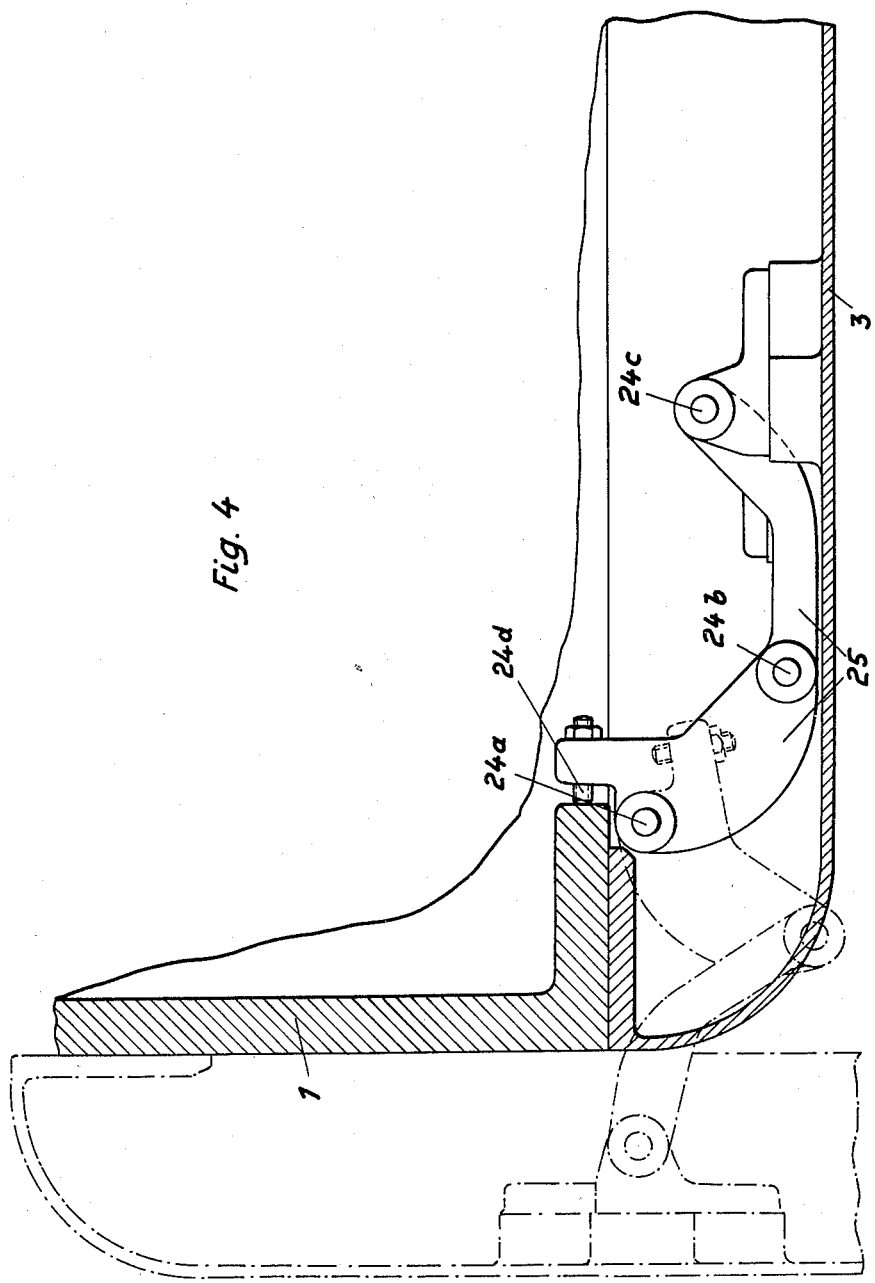

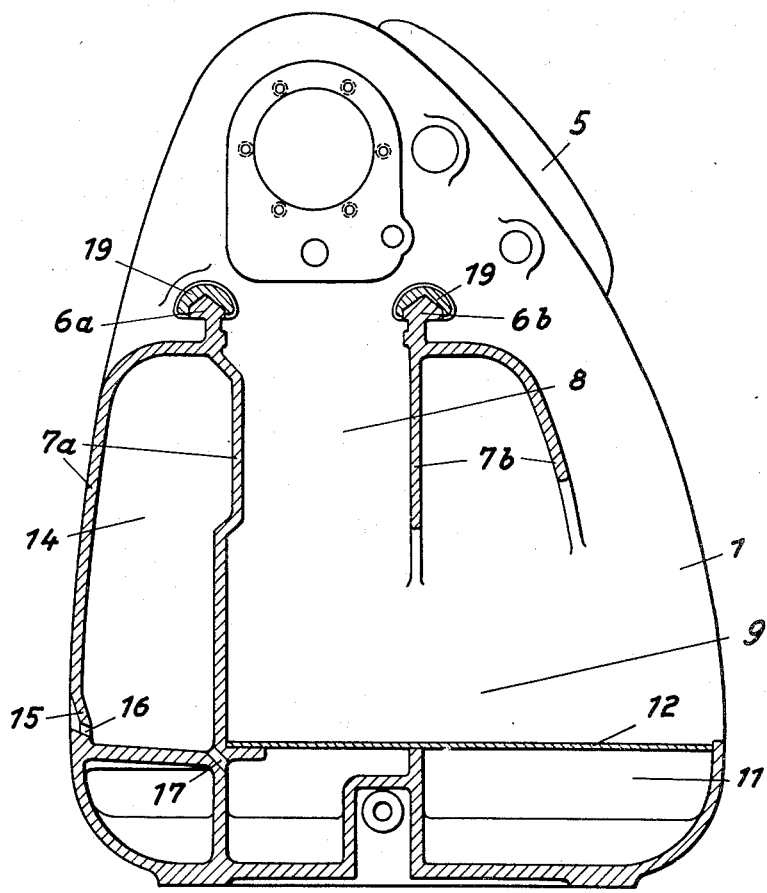

United States Patent Office
2,734,415
Patented Feb. 14, 1956

2,734,415

FRAME FOR LATHES AND TURRET LATHES

Walter Möbius, Bielefeld, Germany, assignor to Gildemeister & Co. A.-G., Bielefeld, Germany, a corporation of Germany Application May 1, 1951, Serial No. 227,362

Claims priority, application Germany May 2, 1950

1 Claim. (Cl. 82—32)

Many efforts have been made in the past to construct frames for lathes and turret lathes which would fulfill different functions at the same time:
(1) To shape the frame corresponding to the static and cynamic conditions of the machine tool; (2) to ensure a controlled flow of the chips, which, during the operating, fall down through openings into the frame; (3) to arrange for a sufficiently large space for the accumulation of the chips; (4) to shape the entire frame in a form which has smooth surfaces and a well-shaped outline.

It is known that the headstock of a lathe and its substructure, too, have equally smooth forms. But if the headstock and the bed of the lathe with the guide tracks are constructed as separate parts, then the smooth form of the lathe is interferred with by the gap between these two separated parts. If the head stock and the bed are cast together as one part, then a smooth blending of parts could not be obtained hitherto.

The substructure of the lathe was often used as a container for the chips or for cooling liquids, but it was then necessary to interfere with the smooth surface of the frame in order to obtain the intended purpose. In all these instances the bed was supported by individual feet, and therefore the beds so constructed have the disadvantage that—considering the usual operating height—the passage for the chips and the space for their accumulation were too small and inaccessible.

It was therefore proposed to use separate troughs which could be withdrawn from the frame, but these parts had also not enough space and had to be moved very often. If their space could be made large enough, then it was difficult to overturn the troughs for the discharge. Furthermore, it was inconvenient that the cooling liquid was mixed with the chips.

A further deficiency of the old forms of the bed was the hindrance of the flow of the chips by stiffening ribs between the walls of the bed, which were necessary to stiffen the bed against vibrations.

These disadvantages could be avoided by constructing the beds with an inclined surface below the operating space so that the guide tracks are situated at different heights; but that construction has the deficiency that the working of the guide tracks and of the machine parts, situated on them, is complicated and very expensive.

All these disadvantages of the known shapes and constructions of the frame or beds of lathes and turret lathes are avoided by the invention.

A main feature of this invention is the new shape of the frame which is now bowl-shaped, that bowl having smooth surfaces which enclose the mechanism of the lathe. The smooth surface of the bowl is complemented by rounded edges between the walls and the bottom, and the bottom is directly set upon the floor, so that feet are no longer necessary. The guide tracks are situated on double wall hollow bodies with smooth surfaces, to attain a great inherent stability in these bodies, and to avoid any stiffening ribs. The space between the inner walls of the bodies is absolutely free for an unhindered flow of the chips.

Another feature of the invention is the provision for the accumulating space for the chips. For that purpose the bottom part of the bowl below the passage of the chips will be employed. Therefore the bottom is laid as deep as possible, resting directly on the floor, so that large quantities of chips can be storaged. The accumulating space is widened in the direction of the rear of the lathe, so that the rear wall of the bowl rises above the back double wall bodies which, in consequence of its own stability, does not need a support on its middle part.

Another feature of the invention relates to the shaping of the whole machine tool, whose frame now gets a smooth pleasing appearance of a nearly closed body. Only the handles for operating the switching and the steering mechanism, and of course the operating space protrude from the frame. All the other machine parts, for instance, the motor, the switches, the gearing devices are situated invisibly within the frame. Also, the transferring parts for the feed mechanism and the electric wires are invisible, and all these parts are protected by the frame against damage. The form of a bowl offers enough capacity to place the driving gears, the motor and switches inside of the frame, so that these parts will not interfere with the neat appearance of the lathe.

The necessary openings for reaching the inner parts of the lathe are closed by doors whose forms are adapted to the adjoining parts of the frame.

The drawing shows a turret lathe as an example of the invention.

Fig. 1 is a front view of the turret lathe;
Fig. 2 is a view of the right side of the turret lathe according to Fig. 1;
Fig. 3 is a section against line A—B of Fig. 1;
Figs. 4 and 5 show details of the door.

The frame 1 of the turret lathe comprising the housing 2 of the headstock and the doors 3 and 5 is shaped as a bowl whose bottom is directly set on the floor. The bowl-shaped frame has smooth surfaces and rounded edges. The guide tracks 6a and 6b are located on the front and rear walls having double walls 7a and 7b, so that the supports for the tracks are shaped as hollow bodies with smooth surfaces having a high inherent stability; these bodies may have a U-like cross-section, with the open side directed downwardly. The passage 8 for the chips is terminated only by the smooth surfaces of the inner walls whose position corresponds with the distance of the guide tracks 6a and 6b. That passage is free of stiffening ribs, which would be a hindrance for a free flow of the chips; that passage extends over the whole length of the turret lathe, so that large quantities of chips could be put aside very quickly.

The collecting space 9 for the chips is provided below the passage 8 and it is lengthened in the direction of the rear of the lathe so that the rear wall of the bowl rises above the back double wall bodies; the collecting space is therefore easy to clean from the rear. This collecting space 9 is bordered on its upper side by the rear walls 7b, which are formed as beams and supported at one end by the housing 2 of the headstock and at the other end by the hollow body 4, which is rectangularly arranged to the guide tracks. In the right face of the frame opening 10 is provided for moving out the chips in the collecting space from that side. A space 11 for cooling liquid is situated below the space 9 and covered by plates 12. The pump 13' for the cooling liquid is placed into the chamber 13 on the right face of the frame and closed by a door which can be opened from the outside. The space 14 between the double walls 7a of the front cheek serves for the placement of the driving shafts and the electric wires.

A channel 15, or trough, is hollowed out in the front wall 7a, so that that channel does not protrude from the smooth surface. The channel serves for the catching of the cooling liquid which is purling over the front surface and it is connected with the space 9 by the channels 16 and 17.

The rounding off on the edges on the bottom are made so large that they may give a guaranty for the free movement of the feet of the workman.

The support for the tools 18 of the turret head wears protective strips 19 which can be moved into the headstock by the recesses 20; these protective strips are made so long that their ends are still within the headstock, if the turret head is in its outermost right position, so that the guide tracks 6a and 6b are always protected by the strips 19 against the falling chips. Felt washers on the recesses 20 hinder the entrance of chips and cooling liquid into the headstock.

The noses 22, formed by recesses 21 in the outer walls near the bottom, serves for clasping around a loading rope.

The alignment of the frame is exerted by precision adjustment screws 23 located next to the foundation screws on the corners of the frame.

The swinging door 3 on the left face of the frame which is adapted to the shape of the frame makes a new kind of hinge and guiding of the door necessary, which is shown in Fig. 4. The hinge 25 has three pivots 24a, 24b, 24c, and is fastened on the inside of the frame 1 and on the oval door 3. That arrangement is necessary to pull away the whole door from the surface of the frame at the beginning of the opening movement, till the centering screw 24d is moved out of the space of the frame. After that movement the door can be swung around the edge of the frame to bring it into the position shown in Fig. 4 by dotted lines, in which the whole opening is cleared, so that the driving motor and the gearings are easily approachable.

The guide pivots 26 fixed on the door 3 engage into the bored holes 27 of the frame 1 for the fixation of the door in the closed position. The locking of the door is then exerted by the closing bolt 29 against the tension of the spring 28. The bolt 29 has on its outer end a turret head 30 with an unround bore 35 to put in a socket wrench, and it has on the other end a nose 31 engaging into the slots 32 of the socket 33 screwed into the frame. The turret head 30 is located in the closing position of the door in the release 34 of the surface of the door 3, so that it is no hindrance for the cleaning, and will not disturb the smooth and neat appearance of the frame. At the releasing movement of the door with the help of the socket wrench the bolts 29 are pressed out by the springs 28, as it is shown in Fig. 5. In that position the turret heads can be seized easily, so that they serve as handles for the opening of the door and the attachment of separate handles is not necessary.

That locking device can also be used for the other doors of the frame.

Having thus described the invention, what I claim as new and desire to be secured by Letters Patent, is as follows:

In a bed structure for turret lathes having at least one support for the operating tools, in combination, a housing for a headstock located in the one end portion of said bed structure, the front walls of the said housing being bowl-shaped and the operative parts of the lathe being invisibly from the outside located in said bowl-shaped housing, guide tracks for said support located upon said bed structure, a hollow body located rectangularly to said guide tracks on the opposite end of said bed structure, inner wall and outer walls forming the longitudinal sides of said bed structure, said outer walls being bowl-shaped in conformity with the bowl-shaped walls of said housing, said inner walls and said outer walls being united below said guide tracks and said guide tracks being located directly above said inner walls to form a smooth passage for chips to be charged into the lathe, the bottom portion of said bed structure being shaped as a collector for chips and for cooling liquid, the lower part of said outer walls adjacent to its largest protrusion being inwardly bent to form rounded edges with said bottom, the backward located walls being arranged to form beams supported by said housing at one end of said bed and being supported at the opposite end by said hollow body to provide a connection below said beams between the space inside of said inner walls with said collector, an inwardly bent trough in the outer face of said front wall and channels connecting said trough with said chip collector.

References Cited in the file of this patent

UNITED STATES PATENTS

| | | |
|---|---|---|
| D. 149,657 | Lomazzo | May 18, 1948 |
| 207,852 | Cherry | Sept. 10, 1878 |
| 291,398 | Putnam | Jan. 1, 1884 |
| 723,704 | Montstream | Mar. 24, 1903 |
| 1,554,161 | Hubbard | Sept. 15, 1925 |
| 1,716,919 | Drissner | June 11, 1929 |
| 1,840,051 | Nenninger | Jan. 5, 1932 |
| 1,951,514 | Lovely | Mar. 20, 1934 |
| 1,971,956 | Hoelcher | Aug. 28, 1934 |
| 2,020,188 | Johnson | Nov. 5, 1935 |
| 2,055,651 | Burrell | Sept. 29, 1936 |
| 2,320,187 | Lawler | May 25, 1943 |
| 2,470,601 | Burke | May 17, 1949 |
| 2,524,043 | Daugherty | Oct. 3, 1950 |
| 2,542,419 | Longstreet | Feb. 20, 1951 |
| 2,612,986 | Lomazzo | Oct. 7, 1952 |

FOREIGN PATENTS

| | | |
|---|---|---|
| 7,134 | Great Britain | Mar. 24, 1909 |